(12) United States Patent
Schimik et al.

(10) Patent No.: US 10,247,073 B2
(45) Date of Patent: Apr. 2, 2019

(54) EXHAUST SYSTEM

(71) Applicant: AUDI AG, Ingolstadt (DE)

(72) Inventors: Viktor Schimik, Bretzfeld (DE);
Florian Hörr, Beerfelden (DE)

(73) Assignee: Audi AG, Ingolstadt (DE)

( * ) Notice: Subject to any disclaimer, the term of this patent is extended or adjusted under 35 U.S.C. 154(b) by 163 days.

(21) Appl. No.: 15/420,880

(22) Filed: Jan. 31, 2017

(65) Prior Publication Data

US 2017/0218818 A1   Aug. 3, 2017

(30) Foreign Application Priority Data

Feb. 3, 2016  (DE) .................. 10 2016 001 197

(51) Int. Cl.
| | |
|---|---|
| *F01N 3/20* | (2006.01) |
| *F01N 3/10* | (2006.01) |
| *F01N 3/021* | (2006.01) |
| *F01N 13/00* | (2010.01) |
| *B01D 46/00* | (2006.01) |

(Continued)

(52) U.S. Cl.
CPC ....... *F01N 3/2053* (2013.01); *B01D 46/0027* (2013.01); *B01D 53/9418* (2013.01); *B01D 53/9422* (2013.01); *B01D 53/9431* (2013.01); *B01D 53/9495* (2013.01); *F01N 3/021* (2013.01); *F01N 3/035* (2013.01); *F01N 3/0814* (2013.01); *F01N 3/0842* (2013.01); *F01N 3/0878* (2013.01); *F01N 3/10* (2013.01); *F01N 3/20* (2013.01); *F01N 3/208* (2013.01); *F01N 3/2066* (2013.01); *F01N 11/002* (2013.01); *F01N 13/009* (2014.06);

(Continued)

(58) Field of Classification Search
CPC .. F01N 3/0878; F01N 13/011; F01N 2410/00; F01N 2410/02; F01N 2410/03; F01N 2410/06
See application file for complete search history.

(56) References Cited

U.S. PATENT DOCUMENTS 5,406,790 A   4/1995   Hirota et al.

FOREIGN PATENT DOCUMENTS

| CN | 101292077 A | 10/2008 |
|---|---|---|
| CN | 203285519 U | 11/2013 |

(Continued)

OTHER PUBLICATIONS

Chinese Search Report dated Nov. 20, 2018 with respect to counterpart Chinese patent application 2016111563945.

(Continued)

*Primary Examiner* — Jonathan Matthias
(74) *Attorney, Agent, or Firm* — Henry M. Feiereisen LLC

(57) ABSTRACT

An exhaust system for a combustion engine includes first and second catalytic converters arranged downstream of the combustion engine in a flow direction of exhaust gas. First and second exhaust pipes extend from the combustion engine to the first and second catalytic converters, respectively, with a first valve disposed in the first exhaust pipe, and a second valve disposed in the second exhaust pipe. The first and second valves operate such that in the presence of an exhaust temperature which is equal to or less than a limit value, at least the first valve opens to allow exhaust gas from the combustion engine to flow through the first catalytic converter, and that the first valve closes and the second valve opens, when the exhaust temperature is greater than the limit value to thereby allow exhaust gas from the combustion engine to flow through the second catalytic converter.

13 Claims, 2 Drawing Sheets

(51) Int. Cl.
*B01D 53/94* (2006.01)
*F01N 3/035* (2006.01)
*F01N 3/08* (2006.01)
*F01N 11/00* (2006.01)
*F02B 37/00* (2006.01)

(52) U.S. Cl.
CPC ............ *F01N 13/011* (2014.06); *F02B 37/00* (2013.01); *B01D 2275/10* (2013.01); *B01D 2279/30* (2013.01); *F01N 2410/02* (2013.01); *F01N 2410/03* (2013.01); *F01N 2510/06* (2013.01); *F01N 2570/14* (2013.01); *F01N 2610/02* (2013.01); *F01N 2900/08* (2013.01); *F01N 2900/1404* (2013.01); *Y02T 10/144* (2013.01); *Y02T 10/24* (2013.01)

(56) References Cited

FOREIGN PATENT DOCUMENTS

| | | |
|---|---|---|
| CN | 103711558 A | 4/2014 |
| DE | 43 42 062 A1 | 6/1994 |
| DE | 196 26 837 A1 | 1/1997 |
| DE | 101 42 804 A1 | 8/2002 |
| DE | 10 2007 052 153 A1 | 5/2009 |
| JP | H0797917 A | 4/1995 |
| JP | H10252454 A | 9/1998 |
| WO | 2005/078252 A1 | 8/2005 |

OTHER PUBLICATIONS

Translation of Chinese Search Report dated Nov. 20, 2018 with respect to counterpart Chinese patent application 2016111563945.

EXHAUST SYSTEM

CROSS-REFERENCES TO RELATED APPLICATIONS

This application claims the priority of German Patent Application, Serial No. 10 2016 001 197.1, filed Feb. 3, 2016, pursuant to 35 U.S.C. 119(a)-(d), the content(s) of which is/are incorporated herein by reference in its entirety as if fully set forth herein.

BACKGROUND OF THE INVENTION

The present invention relates to an exhaust system for use with a combustion engine and to a method for operating such an exhaust system.

It would be desirable and advantageous to provide an improved exhaust system and improved method for operating such an exhaust system to obviate prior art shortcomings.

SUMMARY OF THE INVENTION

According to one aspect of the present invention, an exhaust system for a combustion engine includes first and second catalytic converters arranged downstream of the combustion engine in a flow direction of exhaust gas, the first catalytic converter being configured as NOx storage catalytic converter, and the second catalytic converter being configured as diesel catalytic converter, a first exhaust pipe extending from the combustion engine to the first catalytic converter, a second exhaust pipe extending from the combustion engine to the second catalytic converter in parallel relation to the first exhaust pipe, a first valve disposed in the first exhaust pipe, and a second valve disposed in the second exhaust pipe, the first and second valves operating such that in the presence of an exhaust temperature which is equal to or less than a limit value, at least the first valve opens to allow exhaust gas from the combustion engine to flow through the first catalytic converter, and that the first valve closes and the second valve opens, when the exhaust temperature is greater than the limit value to thereby allow exhaust gas from the combustion engine to flow through the second catalytic converter.

According to another advantageous feature of the present invention, a feeder can be located downstream of the first and second catalytic converters and configured to add a reducing agent to the flow of exhaust gas. For example the feeder can be placed directly downstream of at least one of the catalytic converters, e.g. only the second catalytic converter.

According to another advantageous feature of the present invention, an exhaust turbocharger can be located downstream of at least one of the first and second catalytic converters. For example, the exhaust turbocharger may be placed directly downstream of the first catalytic converter or directly downstream of both catalytic converters.

According to another advantageous feature of the present invention, a diesel particulate filter can be located downstream of the first and second catalytic converters to remove diesel particles from the flow of exhaust gas. For example, the diesel particulate filter can be placed directly downstream of the second catalytic converter.

According to another advantageous feature of the present invention, the first and second catalytic converters can be arranged in parallel relationship to one another in the first and second exhaust pipes. In this configuration, the second catalytic converter can be arranged in flow direction of the exhaust gas upstream of the exhaust turbocharger, with the feeder being arranged between the first and second catalytic converters and the exhaust turbocharger, and with the diesel particulate filter being located downstream of a turbine of the exhaust turbocharger.

According to another advantageous feature of the present invention, the second catalytic converter can be arranged downstream of the first catalytic converter. In this configuration, the second catalytic converter can be arranged in flow direction of the exhaust gas downstream of a turbine of the exhaust turbocharger, with the feeder and the diesel particulate filter being located downstream of the second catalytic converter.

According to another advantageous feature of the present invention, a temperature sensor or thermometer can be provided to measure the exhaust temperature of exhaust gas flowing from the combustion engine to the first and second valves.

According to another aspect of the present invention, a method for operating an exhaust system for a combustion engine includes arranging a first valve in a first exhaust pipe that extends from the combustion engine to a NOx storage catalytic converter, arranging a second valve in a second exhaust pipe that extends in parallel relation to the first exhaust pipe from the combustion engine to a diesel catalytic converter, opening the first valve when a temperature of exhaust gas from the combustion engine is equal to or less than a limit value to allow exhaust gas from the combustion engine to flow through the NOx storage catalytic converter, and closing the first valve and opening the second valve, when the exhaust temperature is greater than the limit value to allow exhaust gas from the combustion engine to flow through the diesel catalytic converter.

According to another advantageous feature of the present invention, the second valve can be closed, when the exhaust temperature is less than or equal to the limit value, which can be a first temperature limit value. Thus, only one of the valves is closed at all times, with the other valve being open. As a result, exhaust gas flows through the first catalytic converter only when the exhaust temperature at a maximum corresponds to the limit value. Normally, the first catalytic converter i.e. the NOx storage catalytic converter, is operated only at temperatures that do not exceed the limit value.

It is also conceivable, to open the second valve when the exhaust temperature reaches a second temperature limit value that is less than the first temperature limit value, at which the first valve is closed. In this case, both valves are open simultaneously when the exhaust temperature is between the first and second temperature limit values and both catalytic converters are used to scrub the exhaust gas.

In one embodiment of the present invention, exhaust gas flows only though one of the two catalytic converters. In a second embodiment of the present invention, exhaust gas flows as a function of the exhaust temperature through the first catalytic converter or bypasses the first catalytic converter to flow along a parallel exhaust pipe. As a result, exhaust gas or possibly partly cleaned exhaust, flows through the second catalytic converter at all times.

According to another advantageous feature of the present invention, a quantity of a reducing agent can be added to the flow of exhaust gas, after the exhaust gas has passed at least one of the catalytic converters, as a function of at least one operating parameter of the combustion engine, such as the engine's emission of nitrogen oxide and/or as a function of the exhaust temperature. Examples of a reducing agent includes liquid urea or ammonia.

According to another advantageous feature of the present invention, a selective catalytic reduction with a diesel particulate filter can be executed after the exhaust gas has passed at least one of the catalytic converters. The diesel particulate filter can have a coating that subjects the exhaust gas to selective catalytic reduction ("SCR"). As an alternative, the exhaust gas may also be conducted through an SCR catalyst for selective catalytic reduction.

It is thereby provided that the exhaust gas initially flows through at least one of the catalytic converters. Thereafter, reducing agent is added to the flow of exhaust gas, and then the exhaust gas undergoes selective catalytic reduction.

An exhaust system according to the present invention thus enables a removal of nitrogen oxides from the exhaust gas directly downstream of the combustion engine, with a switchable NOx storage catalytic converter being used as the first catalytic converter. This NOx storage catalytic converter carries out a catalytic storage of nitrogen oxide (NOx). It is additionally possible to carry out a selective catalytic reduction, using an aqueous urea solution as reducing agent. The exhaust system according to the present invention makes it possible to carry out a combined scrub of exhaust gas by using different measures that complement one another.

When the motor vehicle operates in conditions in which the exhaust gas has a high temperature, e.g. when driving under full power, or when the diesel particulate filter is being regenerated, or in the event the exhaust gas reaches a temperature at which selective catalytic reduction can be carried out, the first valve is closed so that the first catalytic converter can be removed from the flow path of exhaust gas. The first valve may hereby include at least exhaust flaps. Instead, the second valve, which also includes at least one exhaust flap, is opened so that exhaust gas, which has a temperature exceeding the limit value, flows instead through the second catalytic converter, i.e. through a diesel catalytic converter and specifically a diesel oxidation catalytic converter.

By bypassing the first catalytic converter, when the exhaust temperature exceeds the limit value, aging of the first catalytic converter is retarded. As a result, a so-called "light-off" or operating temperature of the first catalytic converter is slight for certain substances so that the first catalytic converter is able to filter these substances out. This involves, for example, a filtering of a mixture of carbon monoxide and hydrocarbons ("CO/HC"), as well as nitrogen oxides (NOx). As a result of the mode of operation of the first catalytic converter in the exhaust system according to the present invention, a pre-conditioned NOx storage catalytic converter is provided, which is able to remove these substances from the exhaust gas at low temperatures, for example during a cold start or a restart of the combustion engine.

When the catalytic converters are positioned in parallel relationship, they are located upstream of the exhaust turbocharger. The first catalytic converter (PIN or pre-turbocharger NOx storage catalytic converter) is a nitrogen oxide storage catalytic converter located upstream of the turbine of the turbocharger. This first catalytic converter is able to carry out a good oxidation of carbon monoxide and hydrogen already at low temperatures. Moreover, the first catalytic converter enables a low-temperature reduction of nitrogen oxides. The first catalytic converter has normally a lower temperature stability than the second catalytic converter. The limit value for the temperature is set to a value at which a high NOx conversion rate can be achieved during selective catalytic reduction.

The second catalytic converter is constructed as a diesel catalytic converter and arranged in parallel to the first catalytic converter, as a pre-turbocharger catalyst ("PTC") upstream of the turbine of the turbocharger, or as a diesel oxidation catalyst ("DOC") or NOx oxidation catalyst ("NOC") downstream of the first catalytic converter and the turbocharger turbine. A NOC can be replaced by a NOx storage catalyst ("NSC"), which performs the same function and has a same coating but has different designation. The second catalytic converter is also able to oxidize carbon monoxide and hydrogen compounds. The second catalytic converter is more temperature-stable than the first catalytic converter. Furthermore, the second catalytic converter also has good activity against nitrogen dioxide or $NO_2$.

The diesel particulate filter, which has a coating for selective catalytic reduction or a catalyst for carrying selective catalytic reduction (SCR) and which is arranged downstream of the turbine of the turbocharger, is able to effect a reduction in nitrogen oxides in a temperature range that is typical for selective catalytic reduction.

By alternative use of two different catalytic converters, which can be connected or disconnected as a function of a respective temperature, the first catalytic converter is subject, La, to less stress, and its effectiveness to carry out a catalytic process of nitrogen oxides is maintained, because it is no longer exposed to high temperatures. The first catalytic converter can be used even when the combustion engine is cold and the exhaust system is cold, and selective catalytic reaction is not yet activated at a temperature that may, for example, be lower than 200° C. Still, even at low temperatures, the first catalytic converter enables a storage of nitrogen oxides (NOx). Furthermore, the operating time of the first catalytic converter can be reduced depending on temperature, thereby also reducing stress from sulfur.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
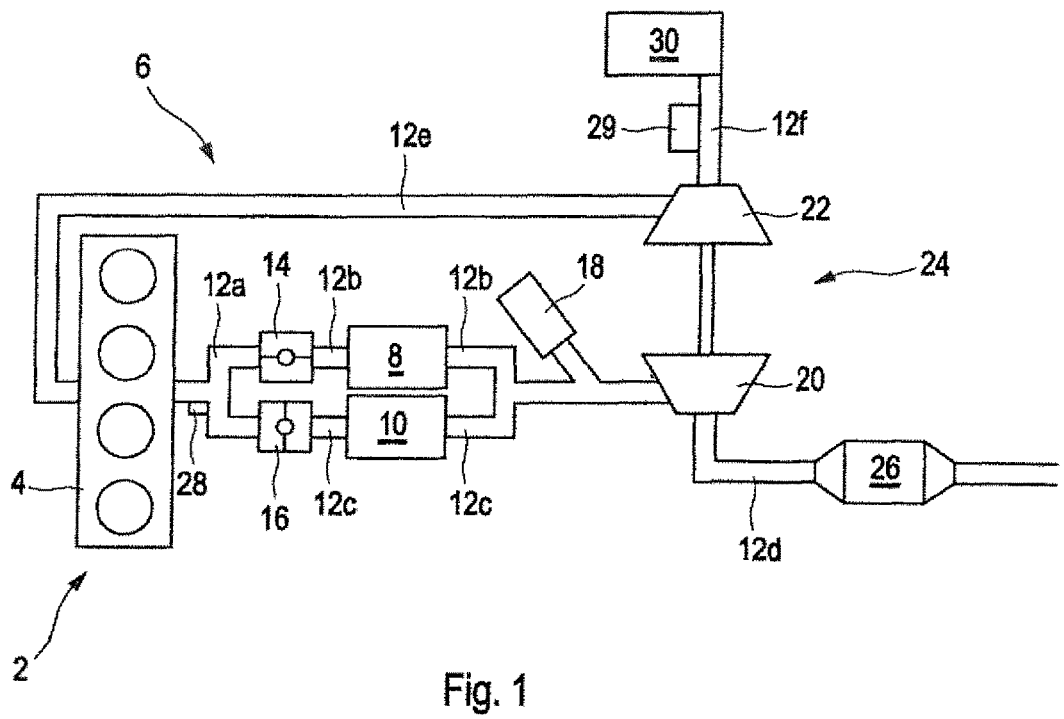
FIG. 1 is a schematic diagram of a first embodiment of an exhaust system in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a first embodiment of an exhaust system in accordance with the present invention, generally designated by reference numeral 6 and installed in a combustion engine 2 which includes a cylinder block 4. The exhaust system 6 includes a first catalytic converter 8 (PIN) and a second catalytic converter 10 (PTC) which are connected with the combustion engine 2 via exhaust pipe 12*a* downstream of the combustion engine 2. The first and second catalytic converters 8, 10 are disposed in exhaust pipes 12*b*, 12*c* extending in parallel relation. In the non-limiting example of FIG. 1, the combustion engine 2 uses diesel fuel as fuel.

Figure 1A:
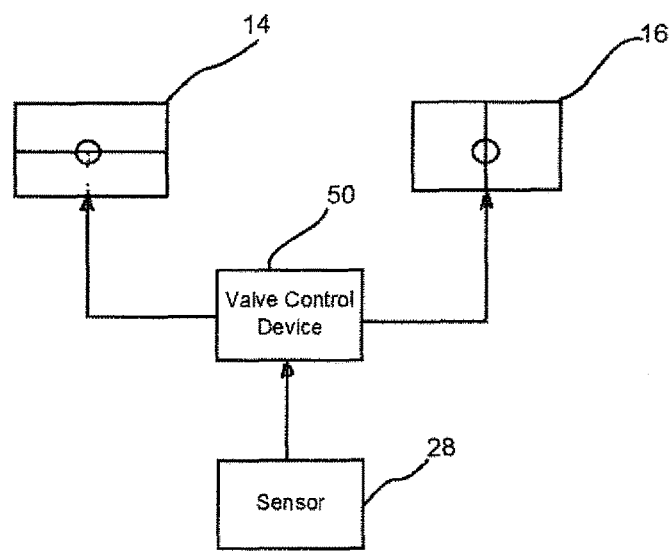
FIG. 1A is a block diagram showing a relationship between components of the exhaust system.

A first valve 14 is disposed between the combustion engine 2 and the first catalytic converter 8. When, as shown in FIG. 1, the first valve 14 is open, exhaust gas from the combustion engine 2 flows to the first catalytic converter 8. When the first valve 14 is closed, the first catalytic converter 8 (a NOx storage catalyst by way of example) is cut off from the combustion engine 2 so that exhaust gas from the combustion engine 2 is prevented from entering it. A second valve 16 is disposed between the combustion engine 2 and the second catalytic converter 10. When the second valve 16 is open, exhaust gas from the combustion engine 2 flows to the second catalytic converter 10. When the second valve 16 is closed, as shown in FIG. 1, the second catalytic converter 10 is cut off from the combustion engine 2 so that exhaust gas from the combustion engine 2 is prevented from entering it. A temperature sensor 28 is arranged upstream of the first and second valves 14, 16, in or on the exhaust pipe 12*a*. The temperature sensor 28 measures the temperature of the exhaust gas which flows directly from the combustion engine 2 towards the valves 14, 16 and/or to the catalytic converters 8, 10. FIG. 1A shows by way of example the provision of a valve control device 50 which is operably connected to the temperature sensor 28 to control opening and closing of the valves 14, 16.

A feeder 18 is located downstream of the catalytic converters 8, 10 to add urea as reducing agent to the exhaust gas that has passed through the catalytic converters 8, 10. A turbine 20 and a compressor 22 of a turbocharger 24 are located downstream of the feeder 18. An exhaust pipe 12*d* connects the turbine 20 with a diesel particulate filter 26 to execute a selective catalytic reduction. Exhaust gas from the compressor 22 is recirculated back to the combustion engine 2 via an exhaust pipe 12*e*. An exhaust pipe 12*f* connects the compressor 22 with an air filter 30 and an air mass sensor 29 (in this example, a hot-film anemometer).

The exhaust system 6 is able to carry out a method in accordance with the invention. Combustion of fuel in the combustion engine 2 generates exhaust gas that flows via the exhaust pipe 12*a* towards the catalytic converters 8, 10. The temperature sensor 28 measures the temperature of the exhaust gas. When the temperature of the exhaust gas does not exceed a limit value, the first valve 14 is opened, thereby allowing exhaust gas to flow through the first valve 14, through the exhaust pipe 12*b* and the first catalytic converter 8, to remove nitrogen oxide, carbon monoxide, and hydrocarbon compounds from the exhaust gas stream. However, when the temperature of the exhaust gas exceeds the limit value, the first valve 14 is closed and the second valve 16 is opened, thereby cutting off the first catalytic converter 8 from the combustion engine 2. Exhaust gas thus flows now from the combustion engine 2 through the second catalytic converter 10, which scrubs the exhaust gas as an alternative to the first catalytic converter 8.

The limit value for the temperature can be defined as a value at which a high NOx conversion rate can be achieved during selective catalytic reduction.

Regardless which of the catalytic converters 8, 10 the exhaust gas passes through, the feeder 18 adds urea as reducing agent and thus an ammonia compound to the flow of exhaust gas. The quantity of urea added to the exhaust gas depends on an emission of nitrogen oxides as operating parameter of the combustion engine 2. Thereafter, exhaust gas flows through the turbine 20 of the turbocharger 24 and undergoes selective catalytic reduction in the diesel particulate filter 26.

Figure 2:
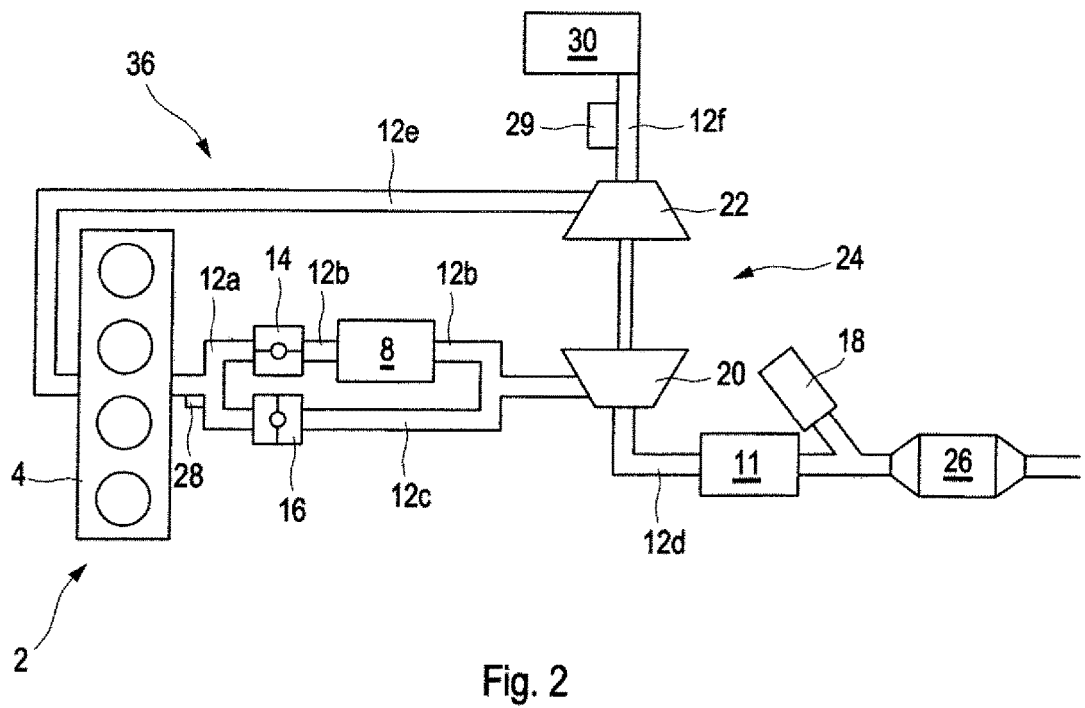
FIG. 2 is a schematic diagram of a second embodiment of an exhaust system in accordance with the invention.

FIG. 2 is a schematic diagram of a second embodiment of an exhaust system in accordance with the invention, generally designated by reference numeral 36. Parts corresponding with those in FIG. 1 are denoted by identical reference numerals and not explained again. The description below will center on the differences between the embodiments. In this embodiment, only the exhaust pipe 12*c* is in parallel with the first catalytic converter 8 in the exhaust pipe 12*b*. A second catalytic converter 11 is constructed in this example as a diesel catalytic converter and is located downstream of the turbine 20. The feeder 18 for adding a reducing agent to the flow of exhaust gas is arranged directly downstream of the second catalytic converter 11, with the diesel particulate filter 26 being again located downstream of the feeder 18.

Figure 3:
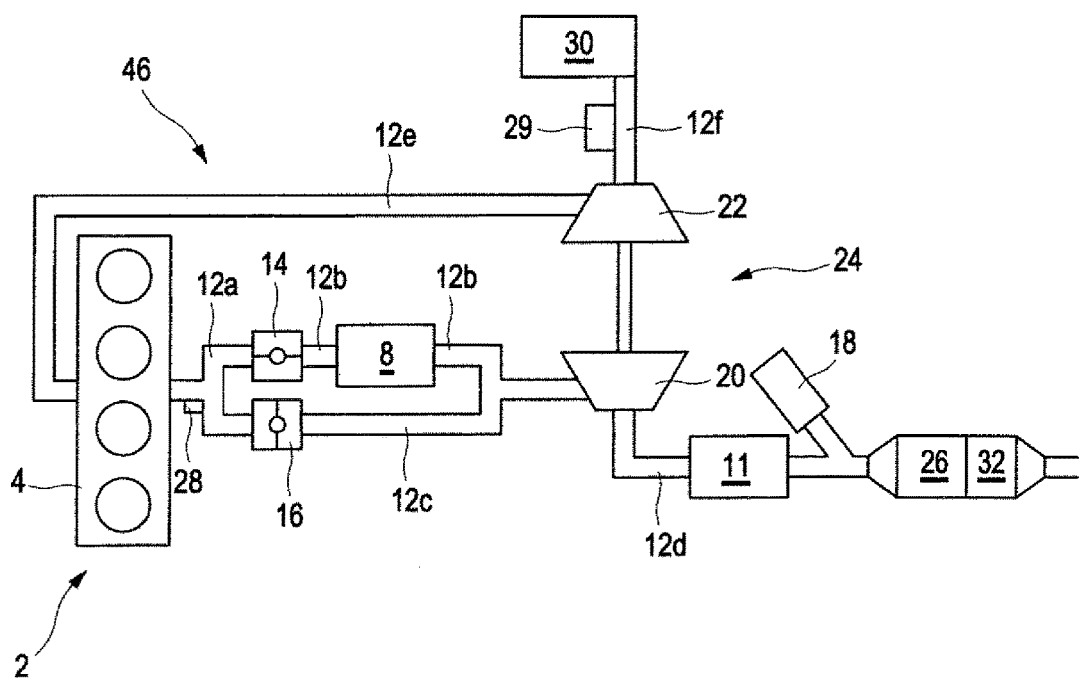
FIG. 3 is a schematic diagram of a third embodiment of an exhaust system in accordance with the invention.

FIG. 3 is a schematic diagram of a third embodiment of an exhaust system in accordance with the invention, generally designated by reference numeral 46. Parts corresponding with those in FIG. 2 are denoted by identical reference numerals and not explained again. The description below will center on the differences between the embodiments. In this embodiment, a module 32 is arranged downstream of the diesel particulate filter 26 to carry out selective catalytic reduction.

In the exhaust systems 36, 46, shown in FIGS. 2 and 3, the first valve 14 is located between the combustion engine 2 and the first catalytic converter 8. Exhaust gas flows from the combustion engine 2 to the first catalytic converter 8, when the valve 14, as shown in FIGS. 2 and 3, is opened. When the valve 14 is closed, the first catalytic converter 8 is cut off from the combustion engine 2. The second valve 16 is located in the exhaust pipe 12*c* between the combustion engine 2 and the second catalytic converter 11. When the second valve 16 is opened, exhaust gas from the combustion engine 2 flows through the exhaust pipe 12*c*. When, as shown in FIG. 1, the second valve 16 is closed, the exhaust pipe 12*c* is cut off from the combustion engine 2. As a result, it is possible for exhaust gas to flow through the exhaust pipe 12*c* instead of flowing through the first catalytic converter 8. The temperature sensor 28, located on or in the exhaust pipe 12*a* upstream of the valves 14, 16, measures the temperature of the exhaust gas as it leaves the combustion engine 2. Since the second catalytic converter 11 is located downstream of the turbine 20 of the turbocharger 24, exhaust gas flows through the second catalytic converter 11 regardless whether or not the exhaust gas has previously flowed through the first catalytic converter 8.

Feeder 18 for adding urea as reducing agent to the flow of exhaust gas is located downstream of the second catalytic converter 11. The diesel particulate filter 26 is located downstream of the feeder 18 so as to carry out selective catalytic reduction of the exhaust gas. Optionally, the additional module 32, as shown in FIG. 3, may be provided downstream of the diesel particulate filter 26 (FIG. 3).

The exhaust systems 36, 46 are configured to execute further methods according to the present invention. Combustion of fuel in the combustion engine 2 generates exhaust gas, which flows through the exhaust pipe 12*a* towards the valves 14, 16. The temperature of the exhaust gas is measured by the temperature sensor 28. When the temperature of the exhaust gas does not exceed a limit value, the valve 14 is opened, causing exhaust gas to flow through the valve 14, the exhaust pipe 12b, and the first catalytic converter 8, thereby removing nitrogen oxide, carbon monoxide, and hydrocarbon compounds from the flow of exhaust gas. Thereafter, the exhaust gas flows through the turbine 20 to the second catalytic converter 11. When the temperature of the exhaust gas exceeds the limit value, the first valve 14 is closed and the second valve 16 is opened instead. In this case, the first catalytic converter 8 is cut off from exhaust gas generated by the combustion engine 2. Exhaust gas flows through the exhaust pipe 12c to the turbine 20, and from there flows to the second catalytic converter 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An exhaust system for a combustion engine, comprising:
    first and second catalytic converters arranged downstream of the combustion engine in a flow direction of exhaust gas, the first catalytic converter being configured as NOx storage catalytic converter, and the second catalytic converter being configured as diesel catalytic converter;
    a first exhaust pipe extending from the combustion engine to the first catalytic converter;
    a second exhaust pipe extending from the combustion engine to the second catalytic converter in parallel relation to the first exhaust pipe;
    a first valve disposed in the first exhaust pipe;
    a second valve disposed in the second exhaust pipe; and
    a valve control device configured to control opening and closing of said first and second valves such that in the presence of an exhaust temperature which is equal to or less than a limit value, at least the first valve opens to allow exhaust gas from the combustion engine to flow through the first catalytic converter, and that the first valve closes and the second valve opens, when the exhaust temperature is greater than the limit value to thereby allow exhaust gas from the combustion engine to flow through the second catalytic converter.

2. The exhaust system of claim 1, further comprising a feeder located downstream of the first and second catalytic converters and configured to add a reducing agent to the flow of exhaust gas.

3. The exhaust system of claim 1, further comprising a diesel particulate filter located downstream of the first and second catalytic converters and configured to remove diesel particles from the flow of exhaust gas.

4. The exhaust system of claim 1, further comprising an exhaust turbocharger located downstream of at least one of the first and second catalytic converters.

5. The exhaust system of claim 1, wherein the first and second catalytic converters are arranged in parallel relationship to one another in the first and second exhaust pipes.

6. The exhaust system of claim 4, wherein the exhaust turbocharger includes a turbine, said first and second catalytic converters being arranged upstream of the turbine, and further comprising a feeder configured to add a reducing agent to the flow of exhaust gas and located downstream of the first and second catalytic converters and upstream of the turbine, and a diesel particulate filter located downstream of the turbine of the exhaust turbocharger.

7. The system of claim 1, wherein the second catalytic converter is arranged downstream of the first catalytic converter.

8. The exhaust system of claim 7, further comprising an exhaust turbocharger which includes a turbine, said second catalytic converter being arranged downstream of the turbine, a feeder configured to add a reducing agent to the flow of exhaust gas, and a diesel particulate filter, wherein the feeder and the diesel particulate filter are located downstream of the second catalytic converter.

9. The exhaust system of claim 1, further comprising a temperature sensor configured to measure the exhaust temperature of exhaust gas flowing from the combustion engine to the first and second valves.

10. A method for operating an exhaust system for a combustion engine, said method comprising:
    arranging a first valve in a first exhaust pipe that extends from the combustion engine to a NOx storage catalytic converter;
    arranging a second valve in a second exhaust pipe that extends in parallel relation to the first exhaust pipe from the combustion engine to a diesel catalytic converter;
    opening the first valve when a temperature of exhaust gas from the combustion engine is equal to or less than a limit value to allow exhaust gas from the combustion engine to flow through the NOx storage catalytic converter; and
    closing the first valve and opening the second valve, when the exhaust temperature is greater than the limit value to allow exhaust gas from the combustion engine to flow through the diesel catalytic converter.

11. The method of claim 10, further comprising closing the second valve when the exhaust temperature is less than or equal to the limit value.

12. The method of claim 11, further comprising feeding a quantity of a reducing agent to the flow of exhaust gas, after the exhaust gas has passed at least one of the catalytic converters, as a function of at least one operating parameter of the combustion engine and/or as a function of the exhaust temperature.

13. The method of claim 11, further comprising executing a selective catalytic reduction with a diesel particulate filter after the exhaust gas has passed at least one of the catalytic converters.

* * * * *